US010164722B1

United States Patent
Napoles et al.

(10) Patent No.: US 10,164,722 B1
(45) Date of Patent: Dec. 25, 2018

(54) DYNAMIC SIGNAL FILTER IN MULTI-ANTENNA SYSTEM

(71) Applicant: Amazon Technologies, Inc., Seattle, WA (US)

(72) Inventors: Adrian Napoles, Cupertino, CA (US); Mudit Sunilkumar Khasgiwala, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 55 days.

(21) Appl. No.: 14/971,719

(22) Filed: Dec. 16, 2015

(51) Int. Cl.
*H04B 17/318* (2015.01)
*H04B 1/10* (2006.01)
*H04B 1/713* (2011.01)
*H04W 84/12* (2009.01)
*H04W 88/06* (2009.01)

(52) U.S. Cl.
CPC ......... *H04B 17/318* (2015.01); *H04B 1/1036* (2013.01); *H04B 1/713* (2013.01); *H04B 2001/1063* (2013.01); *H04W 84/12* (2013.01); *H04W 88/06* (2013.01)

(58) Field of Classification Search
CPC ........ H04B 1/10; H04B 1/7097; H04B 7/005; H03G 3/00; H03G 5/00; H03G 7/00
See application file for complete search history.

(56) References Cited

U.S. PATENT DOCUMENTS

| | | | |
|---|---|---|---|
| 2008/0045152 A1* | 2/2008 | Boes | H04W 16/14 455/63.1 |
| 2010/0227570 A1* | 9/2010 | Hendin | H04B 1/006 455/78 |
| 2010/0322287 A1* | 12/2010 | Truong | H04W 72/1215 375/133 |
| 2011/0014885 A1* | 1/2011 | Fitch | H04B 7/0417 455/115.1 |
| 2013/0083672 A1* | 4/2013 | Johansson | H04W 72/082 370/252 |
| 2013/0273834 A1* | 10/2013 | Sundstrom | H04B 7/155 455/7 |
| 2016/0226535 A1* | 8/2016 | Choi | H04B 1/525 |
| 2016/0352386 A1* | 12/2016 | Mirzaei | H04B 1/525 |

* cited by examiner

*Primary Examiner* — Afshawn M Towfighi
(74) *Attorney, Agent, or Firm* — Lowenstein Sandler LLP

(57) ABSTRACT

A processing device tracks a frequency hopping sequence implemented by a personal area network (PAN) transmitter in a user device and identifies a set of filter coefficients corresponding to a first frequency of a plurality of frequencies in the frequency hopping sequence, wherein the PAN transmitter is currently transmitting a PAN signal at the first frequency. The processing device configures a tunable notch filter with the set of filter coefficients to cause the filter to remove at least a portion of a PAN component at the current frequency from a combined signal received at a wireless local area network (WLAN) receiver in the user device, the combined signal comprising a WLAN component attributable to a received WLAN signal and the PAN component attributable to the PAN signal.

19 Claims, 8 Drawing Sheets

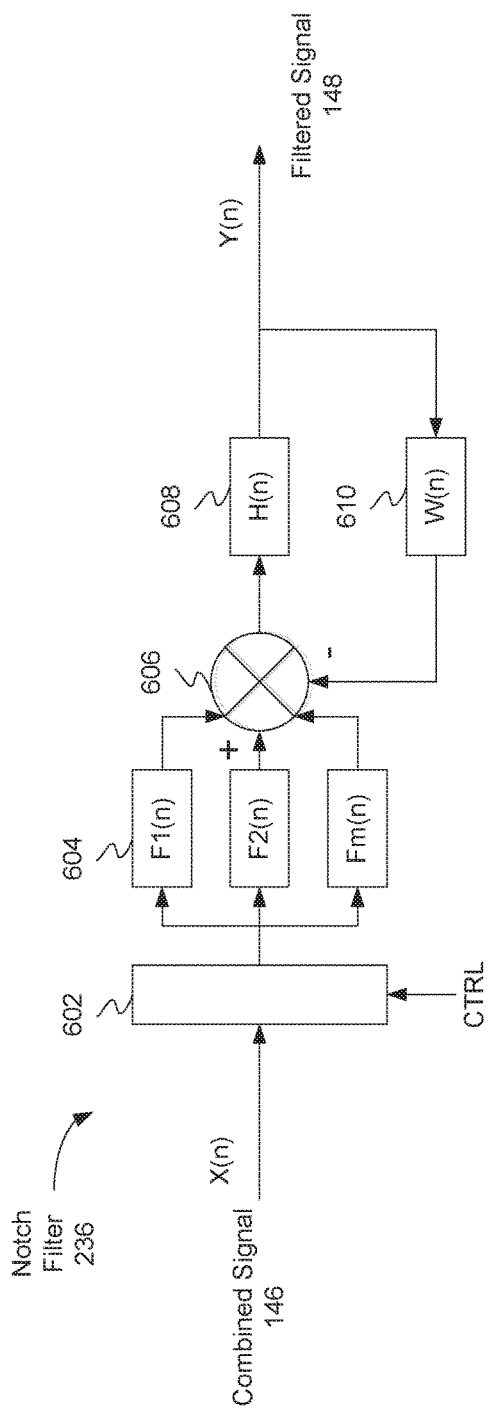
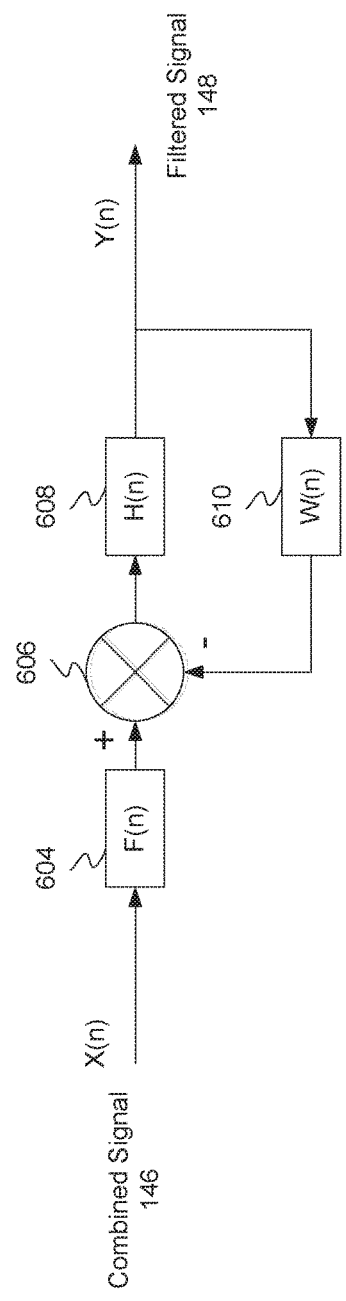

DYNAMIC SIGNAL FILTER IN MULTI-ANTENNA SYSTEM

BACKGROUND

Users enjoy entertainment through the consumption of media items, including electronic media, such as electronic books (also referred to herein as ebooks), electronic newspapers, electronic magazines, other electronic publications, audio books, and digital video. Users employ various electronic devices to consume such media items. Among these electronic devices are electronic book readers, cellular telephones, personal digital assistants (PDAs), portable media players, tablet computers, electronic pads, netbooks, desktop computers, notebook computers, and the like. These electronic devices wirelessly communicate with a communications infrastructure to enable the consumption of the digital media items. In order to wirelessly communicate with other devices, these electronic devices include one or more antennas.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

FIGS. 6A and 6B are block diagrams illustrating a digital implementation of a tunable notch filter, according to an embodiment.

DETAILED DESCRIPTION

Embodiments are described for filtering of frequency hopping aggressor signals from different antennas in a multi-antenna system. In one embodiment, a mobile computing device or other user device includes multiple communication subsystems that can operate simultaneously while using different technologies. For example, the user device may include a personal area network (PAN) communication subsystem and a wireless local area network (WLAN) communication subsystem. In one embodiment, the PAN communication subsystem may include Bluetooth™, Zigbee™, etc., and the WLAN communication subsystem may include WiFi™, etc. When both communication subsystems are operating simultaneously, the device may suffer desense or coexistence issues since they both operate in the same frequency band (e.g., 2.4 GHz). Desense is the degradation in sensitivity due to aggressor signals or noise sources, which may be generated by another radio in the same device. Coexistence issues may include a decrease in performance when multiple communication systems are operating in the same frequency spectrum.

Certain devices implement a time division duplex (TDD) scheme where the PAN communications and WLAN communications are allocated different time slots in the same frequency band, thereby providing infinite signal isolation. Since resources are time shared in the TDD scheme, however, the overall throughput of each communication system may be decreased. A frequency division duplex (FDD) scheme where the PAN communications and WLAN communications use separate frequencies can result in better throughput. If antenna isolation between systems is degraded below approximately 25 dB, however, at least some of the benefits of the FDD scheme may be lost.

In one embodiment, the user device may include a coexistence (COEX) manager component that can solve the desense and coexistence issues among various communication subsystems. In one embodiment, the COEX manager implements a method of dynamically filtering frequency hopping PAN aggressor signals from a received WLAN signal in the user device. The COEX manager can track a frequency hopping sequence used by the PAN communication system to transmit PAN signals in the device and can dynamically adjust a filter, such as a tunable digital notch filter, to remove at least a portion of the PAN signals at the current frequency from WLAN signals received by the WLAN communication subsystem. The digital notch filter can be programmed for a specific frequency and at the desired depth to reject the transmitted PAN signal and reduce the impact on the received WLAN signal, especially in an FDD scheme.

Figure 1:
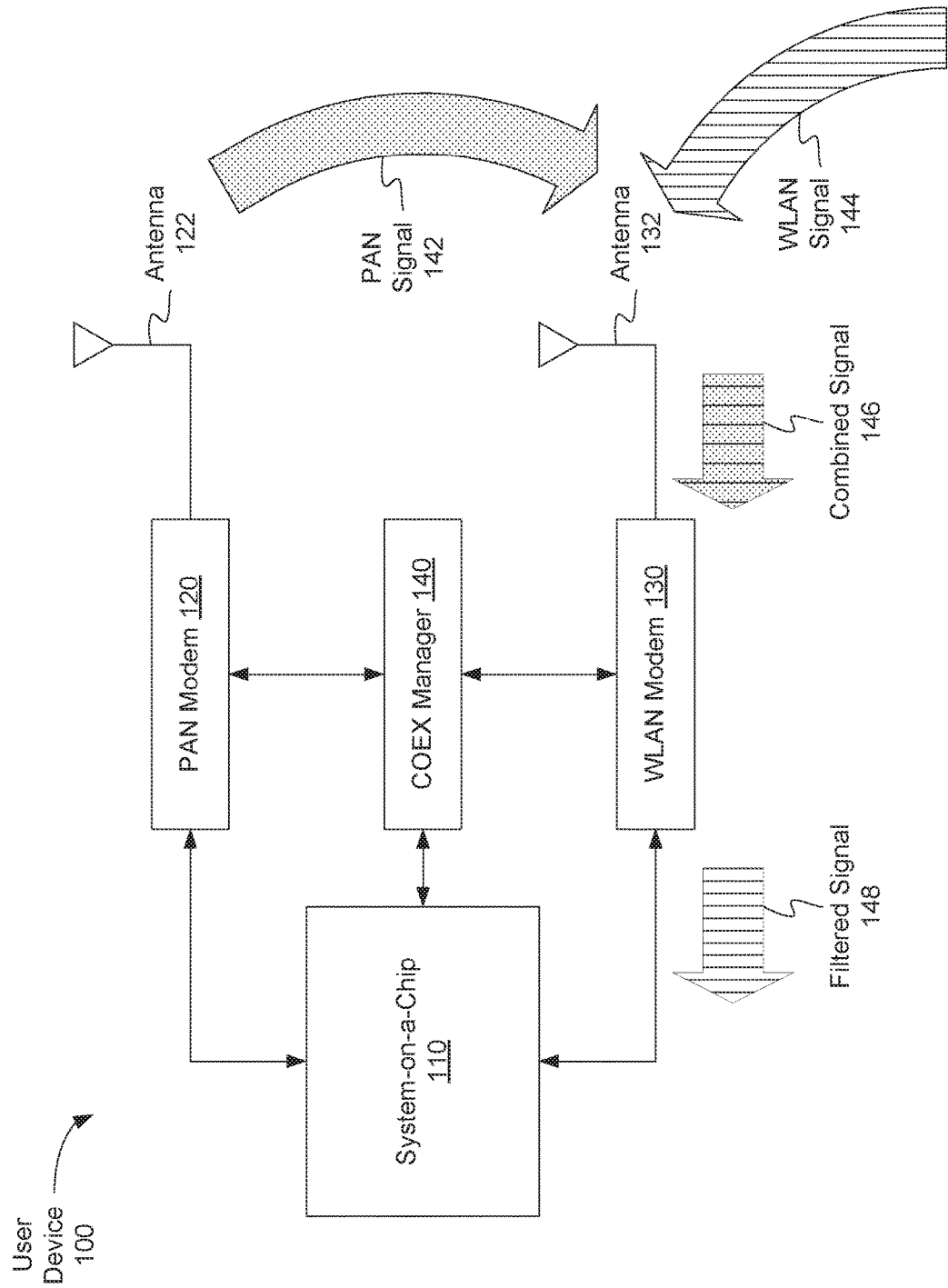
FIG. 1 is a block diagram illustrating filtering of frequency hopping aggressor signals from different antennas in a user device, according to an embodiment.

FIG. 1 is a block diagram illustrating filtering of frequency hopping aggressor signals from different antennas in a user device, according to an embodiment. In one embodiment, a user device 100 includes a multi-antenna system having at least two antennas 122 and 132. User device 100 may be any type of computing device including an electronic book reader, a PDA, a mobile phone, a laptop computer, a portable media player, a tablet computer, an electronic pad, a desktop computer, a camera, a video camera, a netbook, or similar computing device. User device 100 may be variously configured with different features to enable wireless data communication using antennas 122 and 132. In one embodiment, antenna 122 may be connected to a personal area network (PAN) modem 120 and may provide network connectivity using Bluetooth™, Zigbee™, or any other type of PAN technology. Antenna 132 may be connected to a wireless local area network (WLAN) modem 130 and may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed downlink packet access (HSDPA), WiFi™, etc.

In one embodiment, each antenna 122 and 132 may communicate transmission signals to and from the corresponding modems 120 and 130 at multiple different frequencies. For ease of explanation, it can be assumed that antennas 122 and 132 will operate in a frequency band around approximately 2.4 GHz. For example, PAN modem 120 and antenna 122 may transmit PAN signal 142 in the range of approximately 2.402 GHz to 2.482 GHz. WLAN modem 130 and antenna 132 may receive WLAN signal 144 in the range of approximately 2.402 to 2.422 GHz. It should be understood however, that these frequencies are merely examples, and that in other embodiments, antennas 122 and 132 may operate at different or additional frequencies. In some embodiments, WLAN modem 130 may operate in a different frequency band (e.g., around approximately 5 GHz). In these embodiments, adaptive filtering may not be necessary as PAN modem 120 is operating in a different frequency band than WLAN modem 130.

In one embodiment, user device 100 may further include system-on-a-chip (SoC) 110 and coexistence (COEX) manager 140. SoC 110 may be an integrated circuit combining multiple components on a single chip, such as a microcontroller, microprocessor or digital signal processor (DSP) core, memory blocks, timing sources and various interfaces. In one embodiment, SoC 110 may be replaced by a standalone processing device. COEX manager 140 may be designed to interface with SoC 110, PAN modem 120 and WLAN modem 130 in order to manage communications in user device 100 and improve performance in view of the desense and coexistence issues resulting from the multi-antenna system.

In one embodiment, COEX manager 140 implements a method of dynamically filtering frequency hopping a PAN aggressor signal 142 from a received WLAN signal 144 in the user device 100. COEX manager 140 can track a frequency hopping sequence used by PAN modem 120 to transmit PAN signal 142 and can dynamically adjust a filter, such as a tunable digital notch filter present in either WLAN modem 130 or SoC 110, to remove at least a portion of the PAN signal 142 at the current frequency from a combined signal 146 made up from the PAN signal 142 and a received WLAN signal 144. The digital notch filter can be programmed for a specific frequency and at the desired depth to reject the transmitted PAN signal 142 and reduce the impact to the received WLAN signal 144. Once the PAN component of combined signal 146 is filtered out, a filtered signal 148 can be provided to SoC 110 for further processing, such as decoding, decryption, etc.

Figure 2:
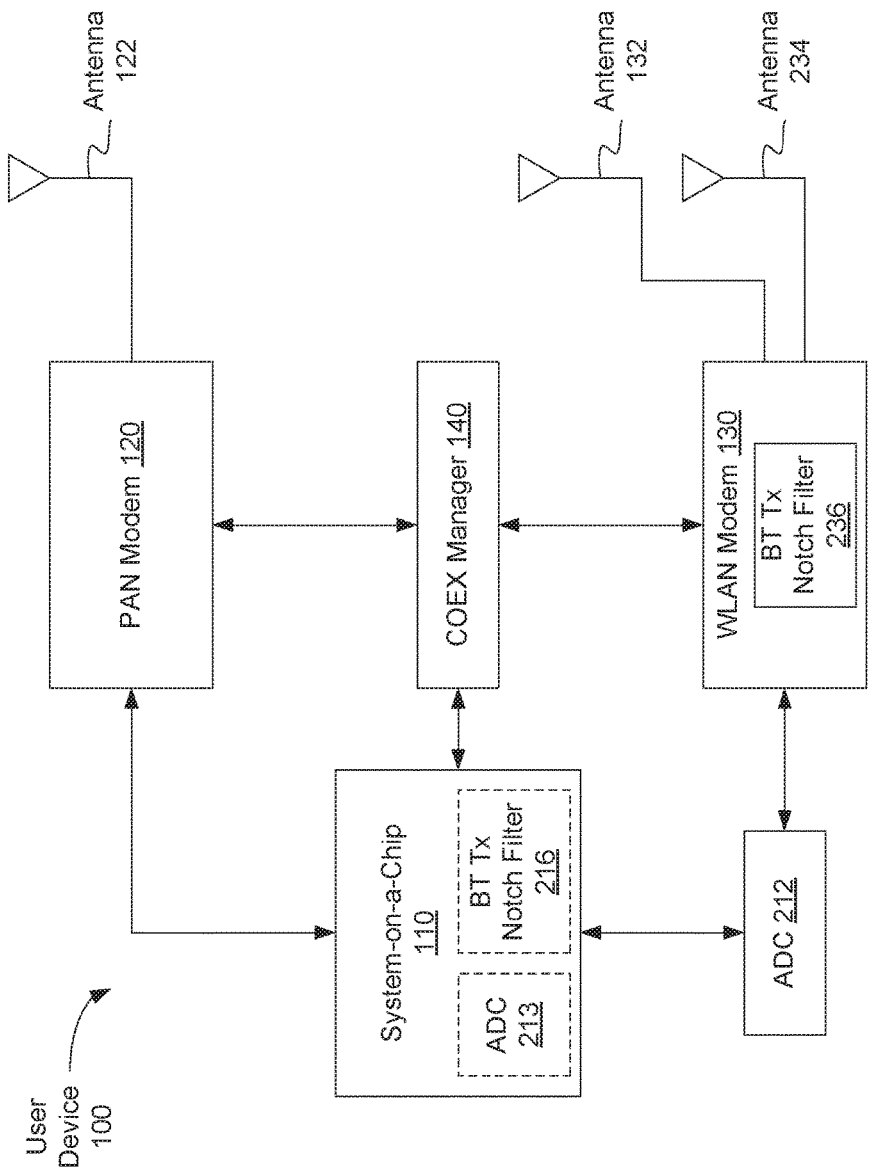
FIG. 2 is a block diagram illustrating a dynamic signal filter in a multi-antenna system, according to an embodiment.

FIG. 2 is a block diagram illustrating a dynamic signal filter in a multi-antenna system, according to another embodiment. In this embodiment, WLAN modem 130 utilizes a pair of antennas 132 and 234. The dual antennas 132 and 234 form antenna diversity which offers two different reference points for signal reception and transmission. Multiple-input and multiple-output (MIMO) systems use multiple antennas at both the transmitter and receiver to communicate wireless signals with improved performance. MIMO technology provides increases in data throughput without requiring additional bandwidth or increased power usage. MIMO systems achieve this goal by spreading the same total transmit power over multiple antennas to achieve an array gain that improves spectral efficiency and diversity gain. Antennas 132 and 234 receive WLAN signals 144 from the local environment. The WLAN signals 144 may be transmitted by any other devices in the relative proximity to user device 100. In one embodiment, in addition to the WLAN signals 144, antennas 132 and 234 may also receive a PAN signal 142 transmitted by antenna 122 in user device 100. PAN modem 120 may transmit PAN signal 142 in the same frequency band used by WLAN modem 130 to receive WLAN signal 144. Thus, when PAN modem 120 transmits at the same time WLAN modem 130 is receiving, the possibility of signal interference exists.

In one embodiment, PAN modem 120 utilizes a frequency hopping sequence to vary the frequency at which PAN signal 142 is transmitted over time. Frequency hopping spread spectrum (FHSS) is a method of transmitting radio signals by rapidly switching a carrier among many frequency channels, using a pseudorandom sequence known to both transmitter and receiver. FHSS is used as a multiple access method in the frequency-hopping code division multiple access (FH-CDMA) scheme. Because radio communication occurs only for brief periods on a radio channel and the frequency hop channel numbers are only known to authorized receivers of the information, transmitted signals that use frequency hopping are difficult to detect and monitor.

In one embodiment, PAN modem 120 uses frequency hopping to transmit information (data) using 79 communication channels, each of 1 MHz bandwidth. PAN modem 120 may have a preprogrammed frequency tuning sequence and this frequency sequence occurs by hopping from channel frequency to channel frequency. To receive information from the transmitter (i.e., PAN modem 120), the receiver (e.g., some other device) uses the exact same hopping sequence. When the transmitter and receiver frequency hopping sequences occur exactly at the same time, information can transfer from the transmitter to the receiver. After the transmitter hops to a new frequency, it transmits a burst of information (i.e., a packet of data), which the receiver can receive because the receiver hops to the same frequency.

An additional scheme known as adaptive frequency hopping (AFH) can further reduce the effects of interference between PAN signals and other types of devices. AFH adapts the access channel sharing method so that the transmission does not occur on channels that have significant interference. By using interference avoidance, devices that operate within the same frequency band and within the same physical area can detect the presence of each other and adjust their communication systems to reduce the amount of overlap (interference) caused by each other. The adaptive frequency hopping process reassigns the transmission of packets on frequency channels that have interference to other channels that have lesser interference levels. This reduced level of interference increases the amount of successful transmissions, thereby increasing the overall efficiency and increased overall data transmission rates for the device and reduces the effects of interference from the transmitter to other devices. In one embodiment, after PAN modem 120 detects the presence of a continuous signal being transmitted by in the 2.4 GHz frequency band, it automatically changes its frequency hopping patter to avoid transmitting on the frequency band that is used by the signal transmission of the other device. This results in more packets being successfully sent by PAN modem 120 and reduced interference from the transmitted signal.

Since PAN modem 120 is continually changing between 1 MHz frequency bands, many of which may be within the 20 MHz frequency band used by WLAN modem 130, filtering out the effects of the PAN signal 142 on the received WLAN signal 144 may be challenging. In one embodiment, COEX manager 140 tracks the frequency hopping sequence utilized by PAN modem 120 and dynamically adjusts a tunable notch filter 236 in WLAN modem 130 to filter out signal components of combined signal 146 at the frequency currently being used by PAN modem 120. As the frequency of PAN signal 142 hops to the next frequency in the sequence, COEX manager 140 is aware of the change and can adjust filter 236 accordingly. In one embodiment, adjusting filter 236 includes loading a new set of filter coefficients (e.g., into an associated configuration register) corresponding to the current frequency. In one embodiment, the filter is calibrated at device power up in order to determine a set of filter coefficients for each frequency that is likely to be used by PAN modem 120. The filter coefficients may be determined in view of the current signal environment of user device 100 (e.g., to account for the presence of various signals nearby) in order to optimize the removal of the PAN signal component.

Once the PAN component of combined signal 146 is filtered out by filter 236, a filtered signal 148 can be provided to SoC 110 for further processing. In one embodiment, combined signal 146 is an analog signal in the intermediate frequency domain. This signal may be applied to analog-to-digital converter 212 which can convert the signal to one in the digital domain and provide the digital signal to SoC 110. In one embodiment, notch filter 216 may optionally be part of SoC 110, rather than in WLAN modem 130. When the filter 216 is part of the SoC, the combined signal 146 may not be converted to the digital domain until after the signal has been applied to filter 216 (e.g., via analog-to-digital converter 213. In yet another embodiment, the notch filter may be separate from both WLAN modem 130 and SoC 110 and may be a standalone element or may be part of another other component of user device 100. Additional details COEX manager 140 and filter 236 are discussed below with respect to FIGS. 3-7.

Figure 3:
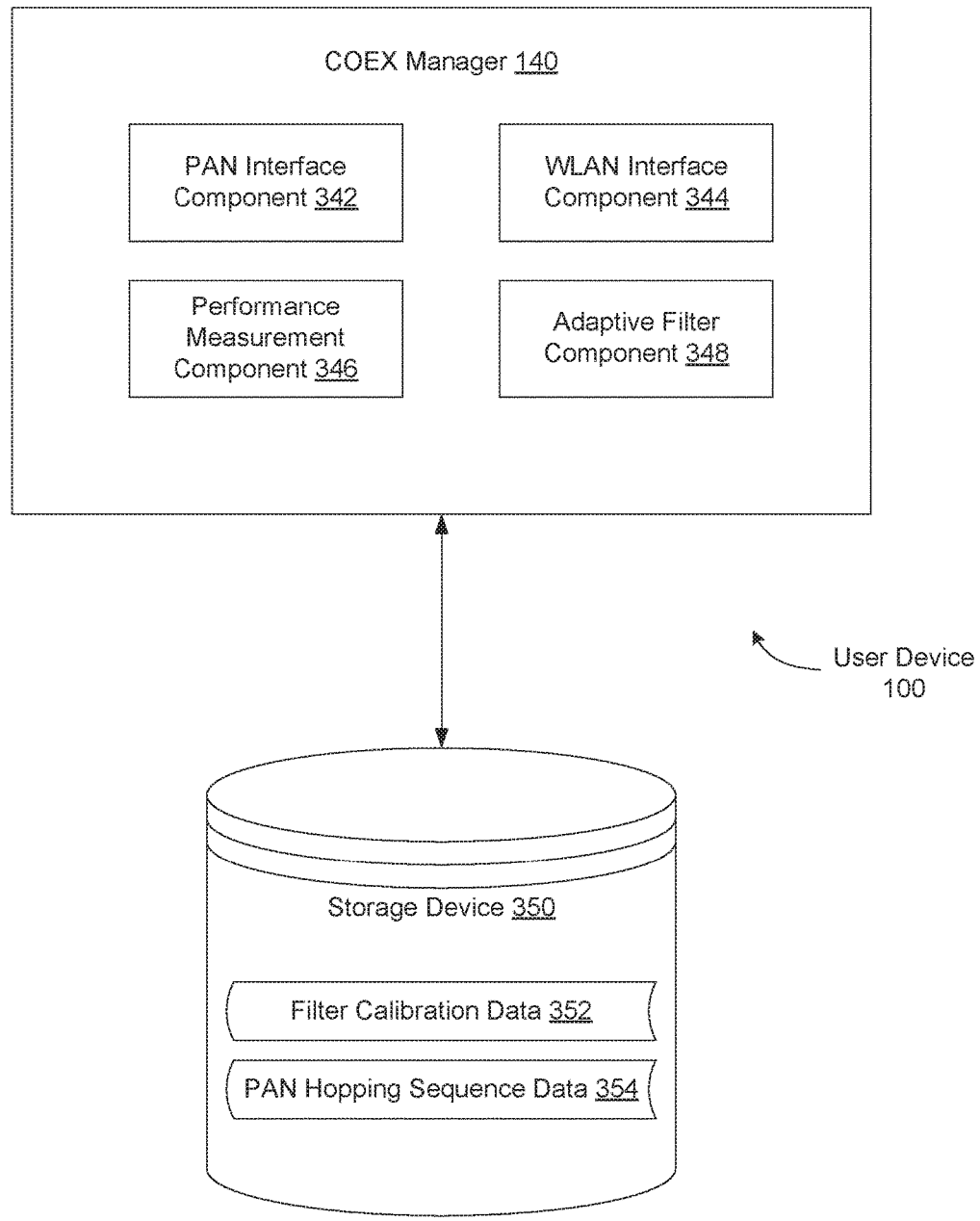
FIG. 3 is a block diagram illustrating a COEX manager, according to an embodiment.

FIG. 3 is a block diagram illustrating a COEX manager 140 that is included in user device 100, according to an embodiment. In one embodiment, COEX manager 140 may include PAN interface component 342, WLAN interface component 344, performance measurement component 346, and adaptive filter component 348. This arrangement of components may be a logical separation, and in other embodiments, these components can be combined together or separated into further components, according to a particular embodiment. In one embodiment, COEX manager 140 is connected to storage device 350 having a data store, which may be, for example, a file system, database or other data management layer resident on a data storage device such as a disk drive, RAM, ROM, flash memory, etc. The data store may include user filter calibration data 352 and PAN hopping sequence data 354. In one embodiment, user device 100 may include both COEX manager 140 and storage device 350. In another embodiment, storage device 350 may be external to user device 100 and may be connected to user device 100 over a network or other connection. In other embodiments, user device 100 may include different and/or additional components which are not shown in order to simplify the description.

In one embodiment, PAN interface component 342 handles communication with PAN modem 120. PAN interface component 342 can receive messages from PAN modem 120 indicating whether PAN modem 120 is currently transmitting and the current frequency of PAN signal 142 being transmitted. PAN interface component 342 can also receive an indication of the frequency hopping sequence being used by PAN modem 120, which can be stored in storage device 350 as PAN hopping sequence data 354, as well as an indication of each time PAN modem 120 changes the frequency being used. During a filter calibration mode, PAN interface component 342 can also send messages to instruct PAN modem 120 to transmit on a certain frequency so that COEX manager 140 can determine the corresponding filter coefficients.

In one embodiment, WLAN interface component 344 handles communication with WLAN modem 130. WLAN interface component 344 can receive messages from WLAN modem 130 indicating whether WLAN modem 130 is currently receiving signals. During a filter calibration mode, WLAN interface component 344 can also assess the signal environment of user device 100 by identifying all of the various signals received at antennas 132 and 234. WLAN interface component 344 can also communicate with WLAN modem 130 to adjust one or more filter coefficients of tunable notch filter 236 based on a determination made by adaptive filter component 348, as will be described below.

In one embodiment, performance measurement component 346 can monitor the performance of WLAN modem 130 and compare various signal characteristics to predetermined thresholds. For example, performance measurement component 346 may assess a received signal strength indicator (RSSI), a packet error rate (PER), a signal to noise ratio (SNR) a number of packet retransmissions, a channel and noise power, throughput, a number of acknowledgment signal retransmissions, a transmission quality, error vector magnitude (EVM), cyclic redundancy check (CRC), forward error correction (FEC), or other metric against a corresponding threshold. If the measure of system performance falls below the threshold, performance measurement component 346 may instruct COEX manager 140 to initiate adaptive filtering in an attempt to improve performance.

In one embodiment, adaptive filter component 348 adjusts the filter coefficients of tunable notch filter 236 based on information received from PAN interface component 342, WLAN interface component 344, and performance measurement component 346. Adaptive filter component 348 may perform an initial filter calibration upon device power up in order to identify a set of filter coefficients corresponding to each frequency in the frequency hopping sequence used by PAN modem 120. Adaptive filter component 348 may store the resulting filter coefficients as filter calibration data 352 in storage device 350. During a filter adaptation routine, adaptive filter component 348 will receive an indication of the current PAN frequency from PAN interface component 342, identify corresponding filter coefficients from filter calibration data 352 and instruct WLAN interface component 344 to adjust filter 236 using the identified coefficients. Adaptive filter component 348 can also disable filter 236 when not in use.

Figure 4:
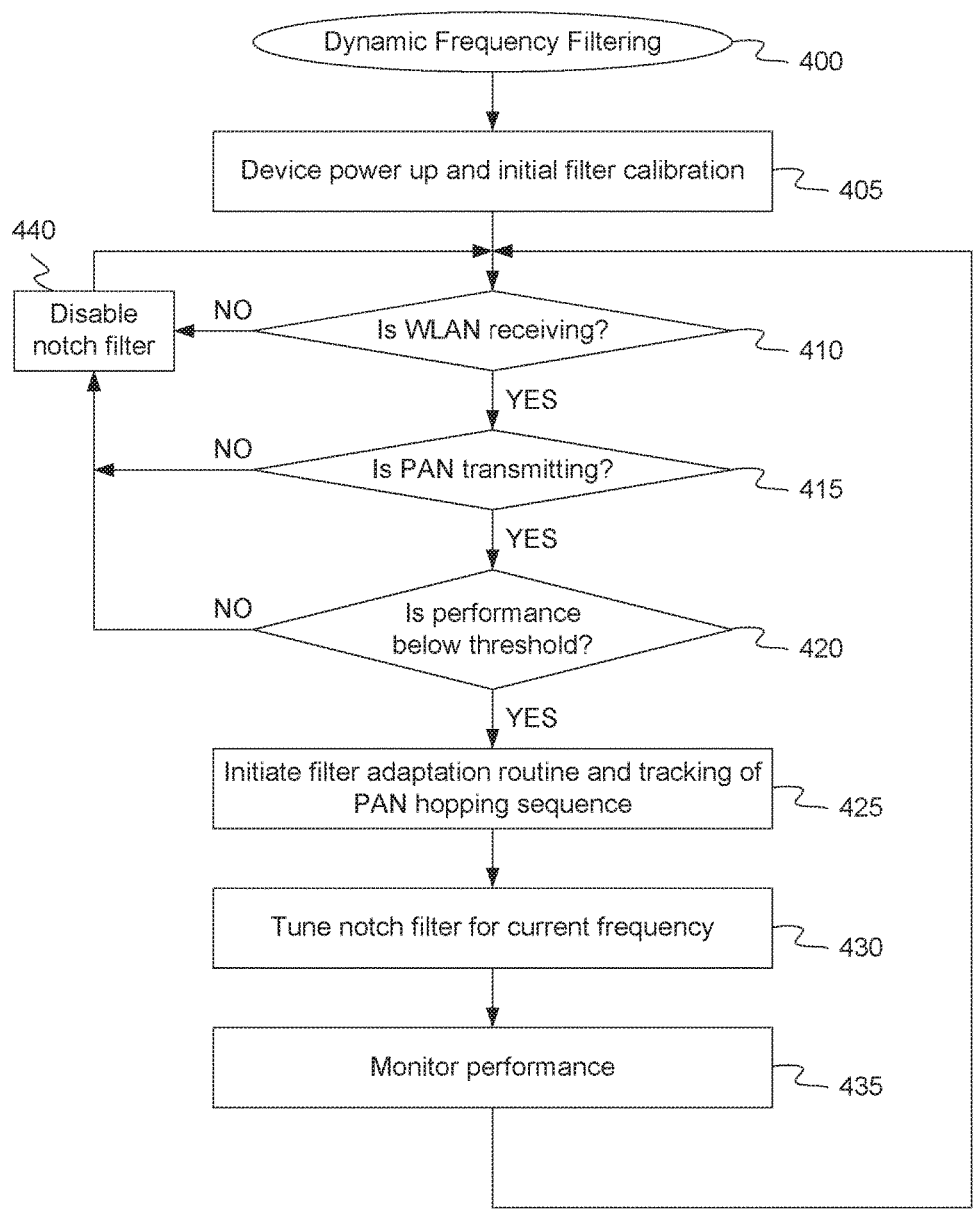
FIG. 4 is a flow diagram illustrating a method for filtering of frequency hopping aggressor signals from different antennas in a user device, according to embodiment.

FIG. 4 is a flow diagram illustrating a method for filtering of frequency hopping aggressor signals from different antennas in a user device, according to embodiment. The method 400 may be performed by processing logic that comprises hardware (e.g., circuitry, dedicated logic, programmable logic, microcode, etc.), software (e.g., instructions run on a processing device to perform hardware simulation), firmware, or a combination thereof. The processing logic is configured to track the frequency hopping sequence of a PAN aggressor signal and dynamically adjust a tunable notch filter to remove at least a portion of the PAN signal from a signal received at a WLAN antenna. In one embodiment, method 400 may be performed by COEX manager 140, as shown in FIGS. 1-3.

Referring to FIG. 4, at block 405, method 400 performs an initial filter calibration routine upon power up of user device 100. The initial filter calibration routine determines a set of filter coefficients corresponding to each frequency in the frequency hopping sequence used by PAN modem 120. Additional details of the filter calibration routine are provided below with respect to FIG. 5.

At block 410, method 400 determines whether PAN modem 120 is currently transmitting a PAN signal at one of a plurality of frequencies in the frequency hopping sequence using antenna 122 in user device 100. In one embodiment, PAN interface component 342 receives a message from PAN modem 120 indicating that PAN modem 120 has initiated a transmission. In another embodiment, PAN interface component 342 may periodically query PAN modem 120 for its transmission status.

If, at block 410, method 400 determines that PAN modem 120 is currently transmitting a PAN signal 142, at block 415, method 400 determines whether WLAN modem 130 is currently receiving a signal using antenna 132 in user device 100. In one embodiment, WLAN interface component 344 receives a message from WLAN modem 130 indicating that WLAN modem 130 has initiated signal reception. In another embodiment, WLAN interface component 344 may periodically query WLAN modem 130 for its reception status.

If, at block 415, method 400 determines that WLAN modem 130 is currently receiving a signal, at block 420, method 400 determines whether a performance level of the received signal is below a threshold. In one embodiment, performance measurement component 346 receives signal performance information from WLAN modem 130 and compares the signal characteristics to a corresponding predetermined threshold. For example, performance measurement component 346 may compare a received signal strength indicator (RSSI), a packet error rate (PER), a number of packet retransmissions, a channel and noise power, throughput, a number of acknowledgment signal retransmissions, a transmission quality, error vector magnitude (EVM), cyclic redundancy check (CRC), forward error correction (FEC), or other metric to a corresponding threshold. If the measure of system performance falls below the threshold, performance measurement component 346 may determine that adaptive filtering can be used to improve performance. In one embodiment, certain performance metrics may have lower values that indicate better performance. In these cases, the system initiates adaptive filtering when the performance measurement is above threshold rather than below. In one embodiment, the thresholds may be set and system may be designed to initiate the filter adaptation routine when the system performance is not below the threshold. In one embodiment, the threshold may be user defined based, for example, on the data rate, modulation scheme, frequency, configuration, regulatory requirements, desired user experience, or other factors.

If, at any of blocks 410-420, method 400 determines that PAN modem 120 is not currently transmitting a PAN signal, that WLAN modem 130 is not currently receiving a signal, or that the performance level of the received signal is not below a threshold, at block 440, method 400 disables or deactivates tunable notch filter 236. Adaptive filter component 348 can disable filter 236 since there is no need to filter out signals at a particular frequency given the current conditions. PAN modem 120 and WLAN modem 130 can continue normal operation.

If at block 420, method 400 determines that a performance level of the received signal is below the corresponding threshold, at block 425, method 400 initiates a filter adaptation routine and begins tracking of the PAN frequency hopping sequence implemented by PAN modem 120. In one embodiment, PAN interface component 342 receives a message from PAN modem 120 indicating the current frequency of PAN signal 142 being transmitted. In another embodiment, PAN interface component 342 may periodically query PAN modem 120 for the current frequency. In another embodiment, PAN interface component 342 may utilize PAN hopping sequence data 354 and an internal device clock to determine the current frequency being used by PAN modem 120.

At block 430, method 400 adjusts the filter coefficients of tunable notch filter 236 to cause tunable notch filter 236 to remove at least a portion of the signal attributable to the PAN transmission at the current frequency in the frequency hopping sequence. In one embodiment, tunable notch filter 236 has a corresponding configuration register to store the current filter coefficients. When PAN interface component 342 identifies the current frequency in the frequency hopping sequence, PAN interface component 342 can pass an indication of the frequency to adaptive filter component 348. Adaptive filter component 348 can then identify a set filter coefficients from filter calibration data 352 that correspond to the current frequency and instruct WLAN interface component 344 to load the identified coefficients into the configuration register. Tunable notch filter 236 will thus be configured to remove at least a portion of the PAN component at the current frequency from the received combined signal 146.

At block 440, method 400 continues to monitor the performance of user device 100 and repeats the operations at blocks 410-440 as appropriate. For example, when the conditions of blocks 410-420 are met, and PAN modem 120 has hopped to the next frequency in the frequency hopping sequence, adaptive filter component 348 can tune filter 236 by adjusting the set of filter coefficients being used to those corresponding to the next frequency.

Figure 5:
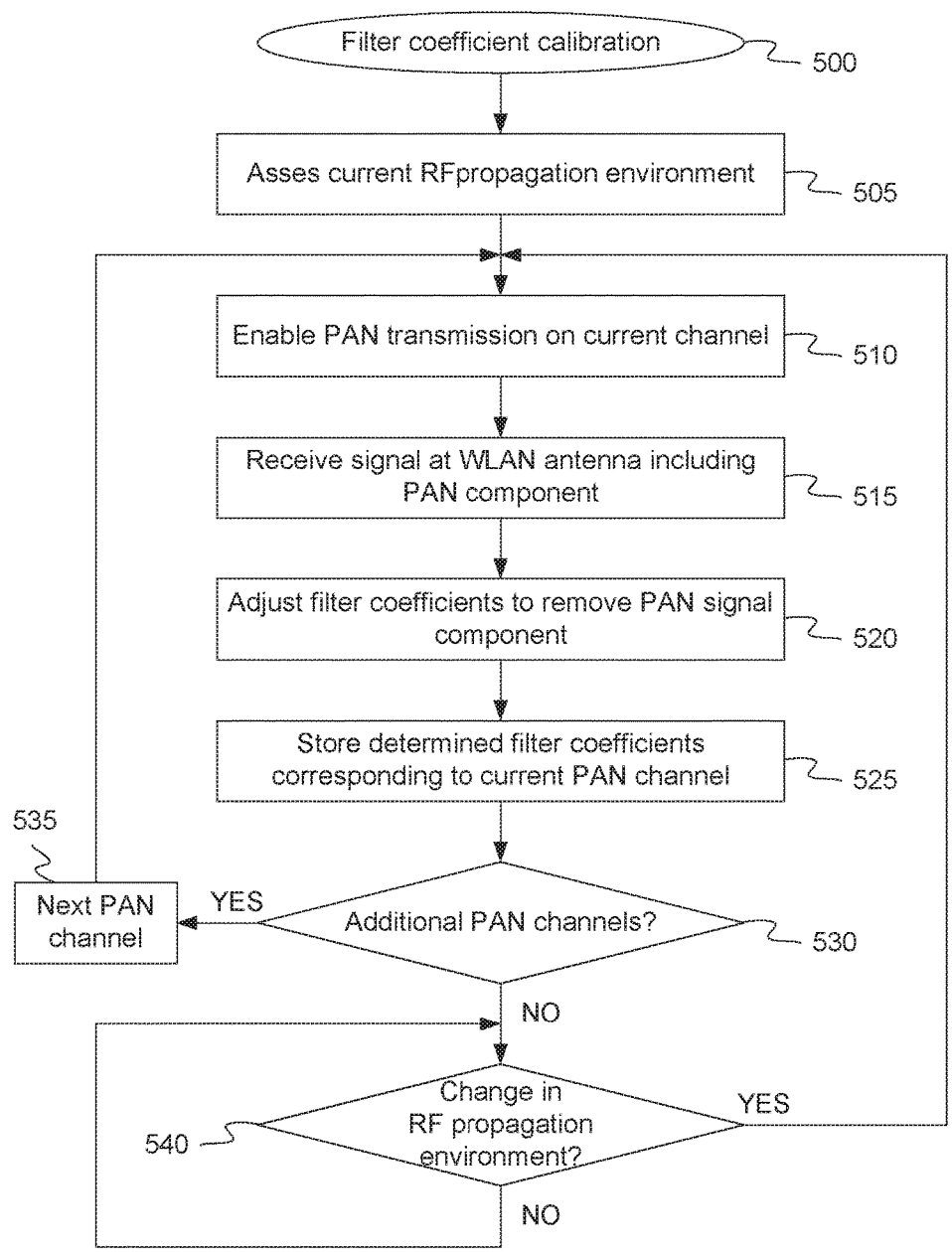
FIG. 5 is a flow diagram illustrating a method for tunable filter calibration and determining filter coefficients, according to embodiment.

FIG. 5 is a flow diagram illustrating a method tunable filter calibration and determining filter coefficients, according to embodiment. The method 500 may be performed by processing logic that comprises hardware (e.g., circuitry, dedicated logic, programmable logic, microcode, etc.), software (e.g., instructions run on a processing device to perform hardware simulation), firmware, or a combination thereof. The processing logic is configured to perform an initial filter calibration and determine a set of filter coefficients corresponding to each frequency used in the PAN frequency hopping sequence. In one embodiment, method 500 may be performed by COEX manager 140, as shown in FIGS. 1-3.

Referring to FIG. 5, at block 505, method 500 assesses the current RF signal propagation environment. In one embodiment, WLAN interface component 344 can assess the signal environment of user device 100 by identifying all of the various signals received at antennas 132 and 234. This may include identifying a number of beacons detected at the antennas, a strength of one or more beacons, etc. The signal environment can have an effect on the filter coefficients used to most effectively filter out aggressor signals, and so is tracked by COEX manager 140.

At block 510, method 500 enables PAN transmission on a first frequency channel in the frequency hopping sequence. In one embodiment, PAN interface component 342 sends a message to instruct PAN modem 120 to transmit on a certain frequency so that COEX manager 140 can determine the corresponding filter coefficients. This may be the lowest frequency in the frequency hopping sequence, the highest frequency in the frequency hopping sequence, a most recently used frequency, or a random frequency. In response, PAN modem 120 may transmit a sample or test data signal at the specified frequency.

At block 515, method 500 receives a combined signal 146 using antenna 132. In one embodiment, the combined signal 146 includes a PAN component attributable to the PAN signal 142 transmitted at block 510 and a WLAN signal 144 from the signal environment.

At block 520, method 500 adjusts filter coefficients of tunable notch filter 236 to remove the PAN component from combined signal 146. In one embodiment, adaptive filter component 348 repeatedly tries various different combination of filter coefficients in the corresponding transfer function of tunable notch filter 236 until an optimal set of filter coefficients is identified that removes all or a highest portion of the PAN component at the PAN transmission frequency from the combined signal 146. The depth of the notch filter 236 may also be tuned so that filter 236 does not remove portions of the WLAN signal 144 at the PAN transmission frequency. Additional details of tuning filter 236 are described below with respect to FIGS. 6 and 7.

At block 525, method 500 stores the filter coefficients determined at block 520, which correspond to the current PAN frequency channel. In one embodiment, adaptive filter component 348 stores the filter coefficients identified at block 520 as filter calibration data 352 in storage device 350. The coefficients may be stored as an entry associated with the PAN transmission frequency, so that they can be identified later during dynamic filter adaptation.

At block 530, method 500 determines whether there are additional PAN frequency channels to calibrate. In one embodiment, adaptive filter component 348 tracks the frequencies for which filter coefficients have been determined. If there are additional PAN frequency channels, at block 535, method 500 adjusts the frequency on which PAN modem 120 is currently transmitting to the next frequency channel in the frequency hopping sequence and repeats the operations at blocks 510-525 for each remaining frequency channel. If there are no additional PAN frequency channels to calibrate, at block 540, method 500 determines whether there has been a change in the RF signal propagation environment. A change in the signals received at antennas 132 and 234 can affect the effectiveness of the filter 236 using the previously determined coefficients. Thus, if there has been a change in the signal environment, method 500 returns to block 510 and repeats the operations at blocks 510-535 for the new signal environment.

FIG. 6A is a block diagram illustrating a digital implementation of a tunable notch filter 236, according to an embodiment. In one embodiment, notch filter 236 includes multiple individual filters 604, each of which can be independently tuned for different resonant frequencies. In one embodiment, the input signal X(n), which represents combined signal 146 from FIG. 1, is applied to filter selector 602. A control signal CTRL received form COEX manager 140 can route the input signal X(n) to one of the individual filters 604 that corresponds to the current PAN transmission frequency. In one embodiment, there are "m" number of individual filters 604, each labeled F1($n$)-Fm(n). In this embodiment, different frequencies can be filtered out in parallel. The outputs of the individual filters 604 are combined together at 606. The output signal Y(n), which represents filtered signal 148 from FIG. 1, can be represented by the following transfer function:

$$[Y(n)/X(n)] = 1/[1+H(n)*W(n)]$$

In this transfer function, "*" represents a convolution function.

FIG. 6B is a block diagram illustrating a digital implementation of a tunable notch filter 236, according to an embodiment. In one embodiment, notch filter 236 includes a single individual filter 604, which can be tuned by COEX manager 140 for different resonant frequencies. In one embodiment, the coefficients of filter 604 can be set according to the current frequency of the PAN signals that make up part of combined signal 146. In this embodiment, different frequencies can be filtered out in series.

Figure 7:
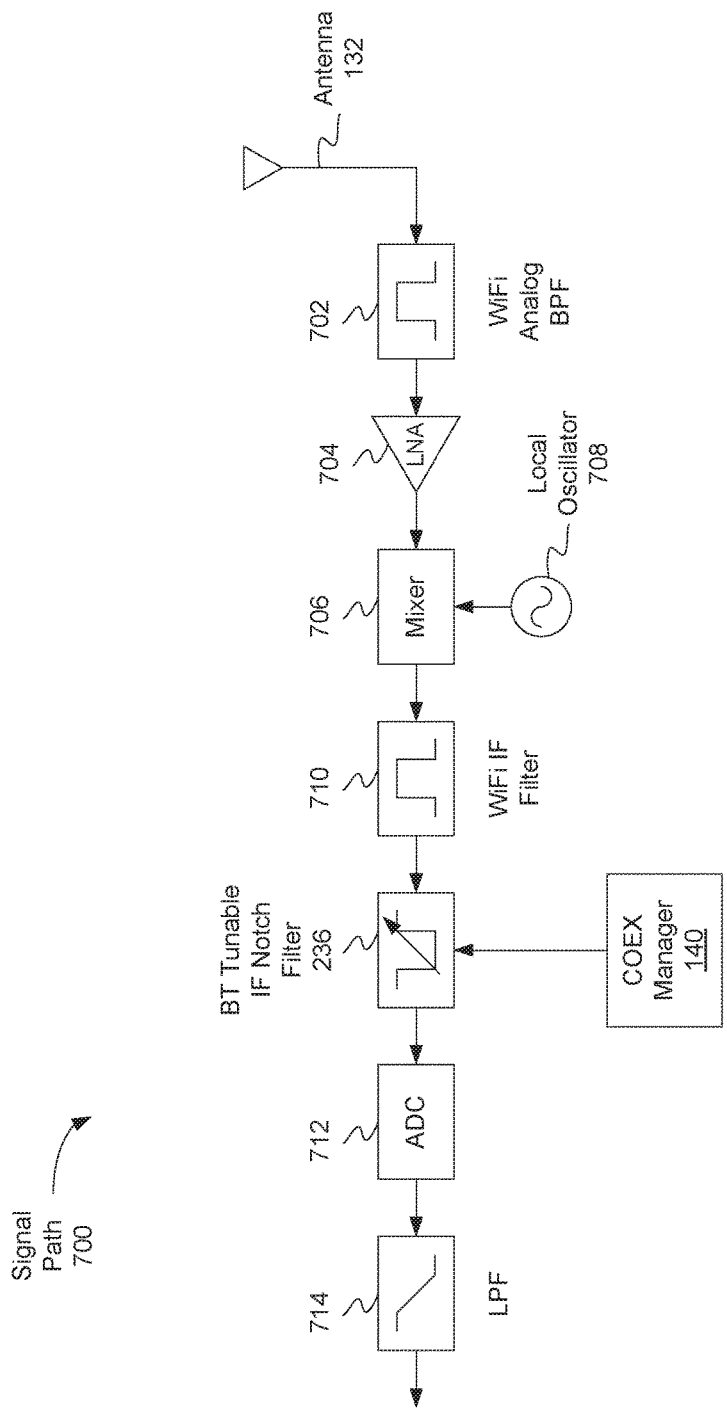
FIG. 7 is a block diagram illustrating an analog implementation of a tunable notch filter, according to an embodiment.

FIG. 7 is a block diagram illustrating an analog implementation of a tunable notch filter 236, according to an embodiment. In one embodiment, signal path 700 begins at antenna 132 and includes analog band pass filter 702, low noise amplifier 704, mixer 706, local oscillator 708, IF filter 710, analog-to-digital converter 712 and low pass filter 714. In one embodiment, antenna 132 receives combined signal 146, as described above. Analog band pass filter 702 removes noise outside the pass band in order to improve the signal-to-noise ratio in the received signal. Low noise amplifier 704 amplifies the received signal in order to allow for further filtering of unwanted background noise. Mixer 706 and local oscillator 708 form a down converter to convert the received RF signal to an intermediate frequency (IF) signal. IF filter 710 further removes noise outside the pass band. Analog-to-digital converter (ADC) 712 converts the output of notch filter 236 (i.e., filtered signal 148) from an analog signal to a digital signal which can be processed by the baseband. Low-pass filter 714 removes ADC noise from the filtered signal 148. In one embodiment, COEX manager can control notch filter 236 by changing the capacitance of the filter 236. Depending on the technology used to implement the capacitor, the capacitance of the filter, and thus, the range of frequencies which are filtered out, can be tuned by applying signals of varying voltages to the filter 236.

Figure 8:
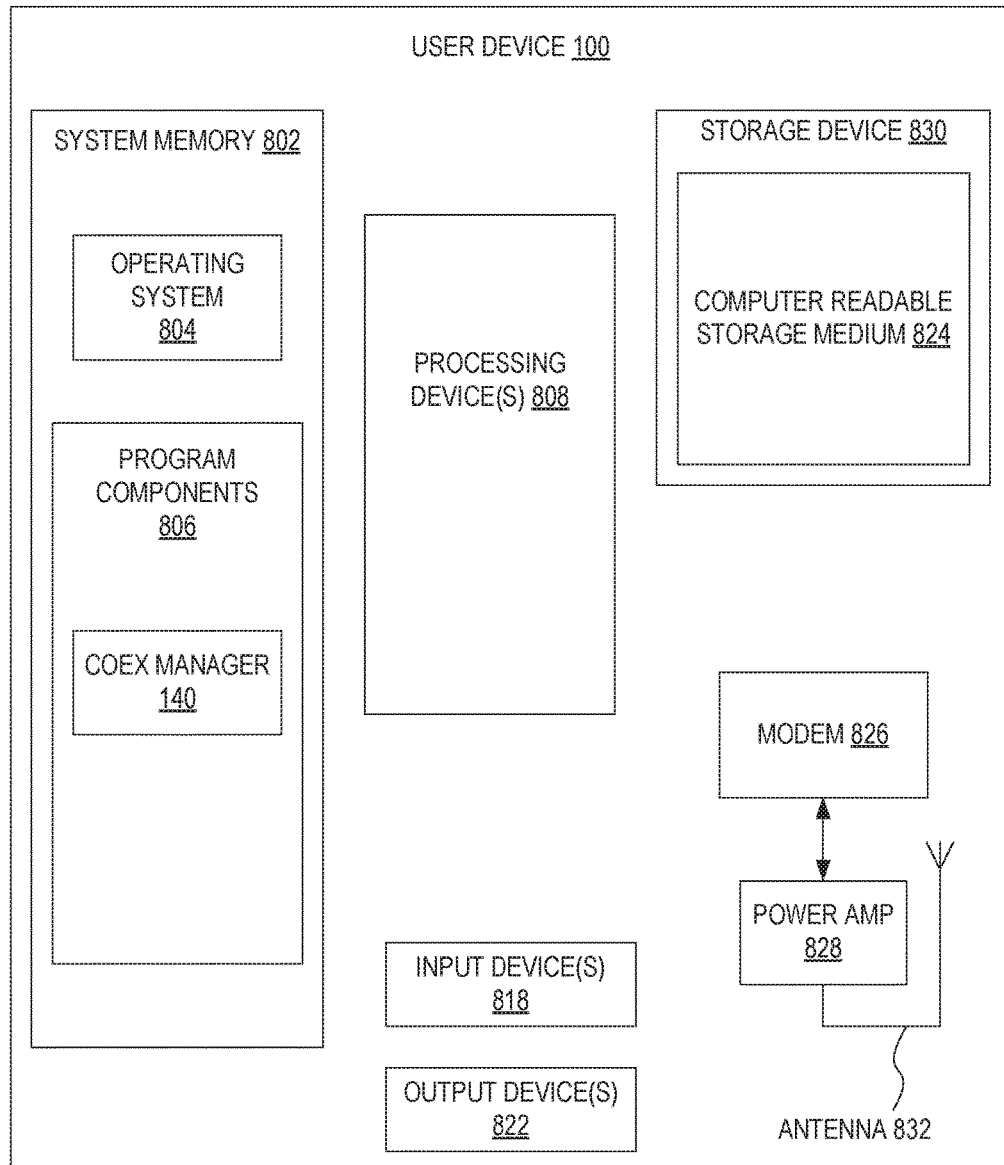
FIG. 8 is a block diagram illustrating a user device configured for filtering of frequency hopping aggressor signals from different antennas, according to an embodiment.

FIG. 8 is a block diagram illustrating a user device configured for filtering of frequency hopping aggressor signals from different antennas, according to an embodiment. Electronic device 100 may include for example, an electronic book reader (eReader), cellular telephone, smartphone, personal digital assistant (PDA), portable media player, tablet computer, electronic pad, netbook, desktop computer, notebook computer, or the like.

The electronic device 100 includes one or more processing devices 808, such as one or more CPUs, microcontrollers, field programmable gate arrays, or other types of processing devices. The electronic device 100 also includes system memory 802, which may correspond to any combination of volatile and/or non-volatile storage mechanisms. The system memory 802 stores information which provides an operating system component 804, various program components 806 including COEX manager 140. The user device 100 performs functions by using the processing device(s) 808 to execute instructions provided by the system memory 802. In one embodiment, processing device(s) 808 and system memory 802 may form part of system-on-a-chip 110.

The user device 100 also includes a data storage device 830 that may be composed of one or more types of removable storage and/or one or more types of non-removable storage. Storage device 830 may include a main memory, such as read-only memory (ROM), flash memory, dynamic random access memory (DRAM) (such as synchronous DRAM (SDRAM), etc.), or a static memory, such as flash memory, static random access memory (SRAM), etc. In other embodiments, storage device 830 may include some other type of storage device for storing information in a form (e.g., software, processing application) readable by a machine (e.g., a computer). The storage device 830 may include a machine-readable medium including, but not limited to, magnetic storage medium (e.g., floppy diskette), optical storage medium (e.g., CD-ROM), magneto-optical storage medium, erasable programmable memory (e.g., EPROM and EEPROM), flash memory; or another type of medium suitable for storing electronic instructions. In one embodiment, the data storage device 830 includes a computer-readable storage medium 824 on which is stored one or more sets of instructions embodying any one or more of the methodologies or functions described herein. As shown, the instructions may reside, completely or at least partially, within the non-transitory computer readable storage medium 824, system memory 802 and/or within the processing device(s) 808 during execution thereof by the user device 100, the system memory 802 and the processing device(s) 808 also constituting computer-readable media. The user device 100 may also include one or more input devices 818 (keyboard, mouse device, specialized selection keys, etc.) and one or more output devices 822 (displays, printers, audio output mechanisms, etc.).

The user device 100 further includes a wireless modem 826 to allow the user device 100 to communicate via a wireless network (e.g., such as provided by the wireless communication system) and/or with other computing devices, such as remote computers, the item providing system, online book stores, electronic catalogs for libraries, and so forth. The wireless modem 826 may allow the user device 100 to handle both voice and non-voice communications (such as communications for text messages, multimedia messages, media downloads, web browsing, etc.). The wireless modem 826 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed downlink packet access (HSDPA), WiFi™, etc. The wireless modem 826 may generate signals and send these signals to power amplifier (amp) 828 for amplification, after which they are wirelessly transmitted via antenna 832. In addition to sending data, antenna 832 also receives data, which is sent to wireless modem 826 and transferred to processing device(s) 808. In one embodiment, modem 826 may represent one or more of PAN modem 120 or WLAN modem 130 and antenna 832 may represent any of antennas 122, 132, or 234.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   determining a plurality of sets of filter coefficient values, each set corresponding to a different respective frequency of a plurality of frequencies in a frequency hopping sequence;

transmitting a BLUETOOTH® wireless signal at the plurality of frequencies in the frequency hopping sequence over time using a first antenna in a user device;

receiving a combined signal via a second antenna in the user device, the combined signal comprising a received WI-FI® wireless signal at 2.4 gigahertz and the BLUETOOTH® wireless signal;

determining, by a processing device, that a received signal strength indicator (RSSI) of the WI-FI® wireless signal is below a threshold;

identifying, by the processing device, a current frequency of the plurality of frequencies in the frequency hopping sequence being used to transmit the BLUETOOTH® wireless signal;

identifying a first set of filter coefficient values, from the plurality of sets of the filter coefficient values, the first set corresponding to the current frequency;

setting, by the processing device, one or more filter coefficients of a tunable notch filter in the user device to the first set of filter coefficient values corresponding to the current frequency, the first set of filter coefficient values to cause the tunable notch filter to remove at least a portion of the BLUETOOTH® wireless signal at the current frequency from the combined signal to generate a filtered signal; and providing the filtered signal to the processing device for decoding of the filtered signal.

2. The method of claim 1, further comprising:

detecting a change of the current frequency to a second frequency in the frequency hopping sequence; and setting the one or more filter coefficients of the tunable notch filter to a second set of filter coefficient values corresponding to the second frequency, the second set of filter coefficient values to cause the tunable notch filter to remove at least a portion of the BLUETOOTH® wireless signal at the second frequency from the combined signal.

3. The method of claim 1, further comprising:

comparing at least one of the RSSI, a packet error rate (PER), a signal to noise ratio (SNR) or a number of packet retransmissions to a corresponding threshold.

4. An apparatus comprising:

a personal area network (PAN) transmitter to transmit a PAN signal at a plurality of frequencies in a frequency hopping sequence over time;

a wireless local area network (WLAN) receiver to receive a combined signal comprising a received WLAN signal and at least a portion of the PAN signal;

a filter coupled to the WLAN receiver;

a memory; and a processing device, operatively coupled to the memory, the processing device to:

determine a plurality of sets of filter coefficient values, each set corresponding to a different respective frequency of the plurality of frequencies;

track the plurality of frequencies;

identify a first set of filter coefficient values, from the plurality of sets of the filter coefficient values, the first set corresponding to a first frequency of the plurality of frequencies in the frequency hopping sequence at which the PAN transmitter is currently transmitting; and configure the filter with the first set of filter coefficient values to cause the filter to remove at least a portion of the PAN signal at the first frequency from the combined signal.

5. The apparatus of claim 4, wherein the plurality of sets of filter coefficient values comprises the first set of filter coefficient values and a second set of filter coefficient values, wherein the second set of filter coefficient values corresponds to a second frequency of the plurality of frequencies in the frequency hopping sequence.

6. The apparatus of claim 4, wherein the processing device further to:

determine that a performance level of the WLAN signal is below a threshold by comparing at least one of a received signal strength indicator (RSSI), a packet error rate (PER), a signal to noise ratio (SNR) or a number of packet retransmissions to a corresponding threshold.

7. The apparatus of claim 4, wherein the filter comprises at least one of a tunable analog notch filter or a tunable digital notch filter.

8. The apparatus of claim 4, wherein the PAN signal comprises a BLUETOOTH® wireless signal and wherein the WLAN signal comprises a WI-FI® wireless signal.

9. The apparatus of claim 4, further comprising:

a first antenna coupled to PAN transmitter, the PAN transmitter to transmit the PAN signal via the first antenna; and a second antenna coupled to the WLAN receiver, the WLAN receiver to receive the combined signal via the second antenna.

10. The apparatus of claim 4, wherein the processing device further to:

detect a change of the current frequency to a second frequency in the frequency hopping sequence;

identify a second set of filter coefficient values corresponding to the second frequency; and configure the filter with the second set of filter coefficient values to cause the filter to remove at least a portion of the PAN signal at the second frequency from the combined signal.

11. A method comprising:

determining a plurality of sets of filter coefficient values, each set corresponding to a different respective frequency of a plurality of frequencies in a frequency hopping sequence;

tracking, by a processing device, the plurality of frequencies;

identifying, by the processing device, a set of filter coefficient values, from the plurality of sets of the filter coefficient values, the first set corresponding to a first frequency of the plurality of frequencies in the frequency hopping sequence at which the transmitter is currently transmitting by accessing the predetermined filter calibration data stored in the memory; and configuring, by the processing device, a tunable notch filter in the user device with the set of filter coefficient values, the configuring to cause the tunable notch filter to remove at least a portion of a signal at the first frequency received by a receiver in the user device.

12. The method of claim 11, wherein tracking the frequency hopping sequence implemented by the transmitter comprises tracking the frequency hopping sequence implemented by a personal area network (PAN) transmitter.

13. The method of claim 12, wherein configuring the tunable notch filter comprises configuring the tunable notch filter to cause the tunable notch filter to remove at least a portion of a PAN signal at the first frequency from the signal received by a wireless local area network (WLAN) receiver.

14. The method of claim 13, further comprising:
determining that a performance level of the signal received by the WLAN receiver is below a threshold; and
initiating a filter adaptation routine to configure the tunable notch filter.

15. The method of claim 14, wherein determining that the performance level of the signal received by the WLAN receiver is below the threshold comprises comparing at least one of a received signal strength indicator (RSSI), a packet error rate (PER), a signal to noise ratio (SNR) or a number of packet retransmissions to a corresponding threshold.

16. The method of claim 11, further comprising:
receiving an indication of transmission of a PAN signal at the first frequency of the plurality of frequencies in the frequency hopping sequence by the PAN transmitter; and
identifying the first frequency of the plurality of frequencies in the frequency hopping sequence from the indication.

17. The method of claim 11, further comprising:
receiving an indication of reception of a combined signal by the WLAN receiver, the combined signal comprising a received WLAN signal and a PAN signal.

18. The method of claim 11, further comprising:
detecting a change of the first frequency to a second frequency in the frequency hopping sequence;
identifying a second set of filter coefficient values corresponding to the second frequency; and
configuring the tunable notch filter with the second set of filter coefficient values to cause the tunable notch filter to remove at least a portion of the signal at the second frequency.

19. The method of claim 11, wherein the signal received by the receiver comprises a combination of a BLUETOOTH® wireless signal and a WI-FI® wireless signal.

* * * * *